Josephus H. Griffin
INVENTOR.

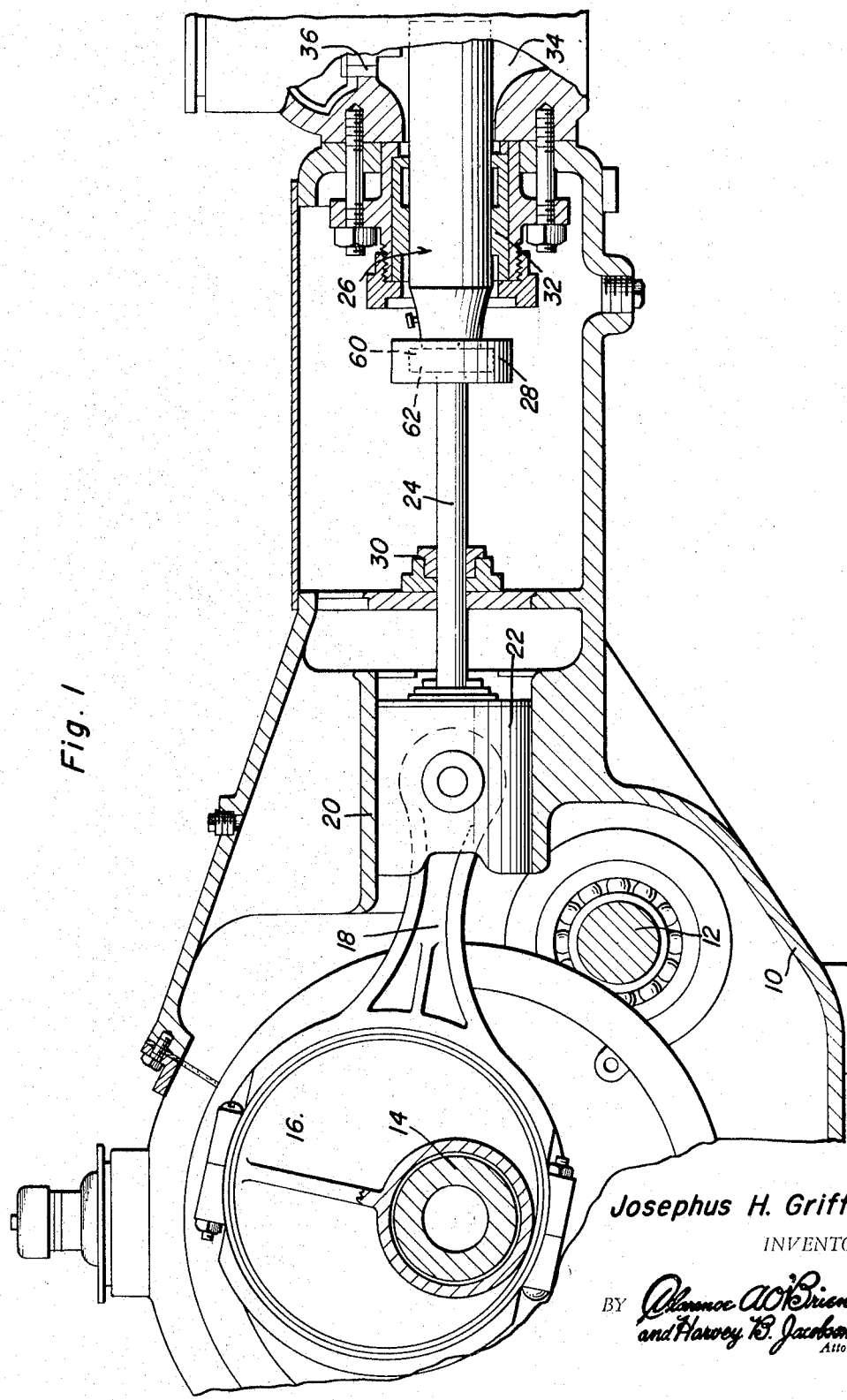

Jan. 17, 1967 J. H. GRIFFIN 3,298,317
HIGH PRESSURE VARIABLE VOLUME PUMP
Filed April 7, 1964 4 Sheets-Sheet 3

Josephus H. Griffin
INVENTOR.

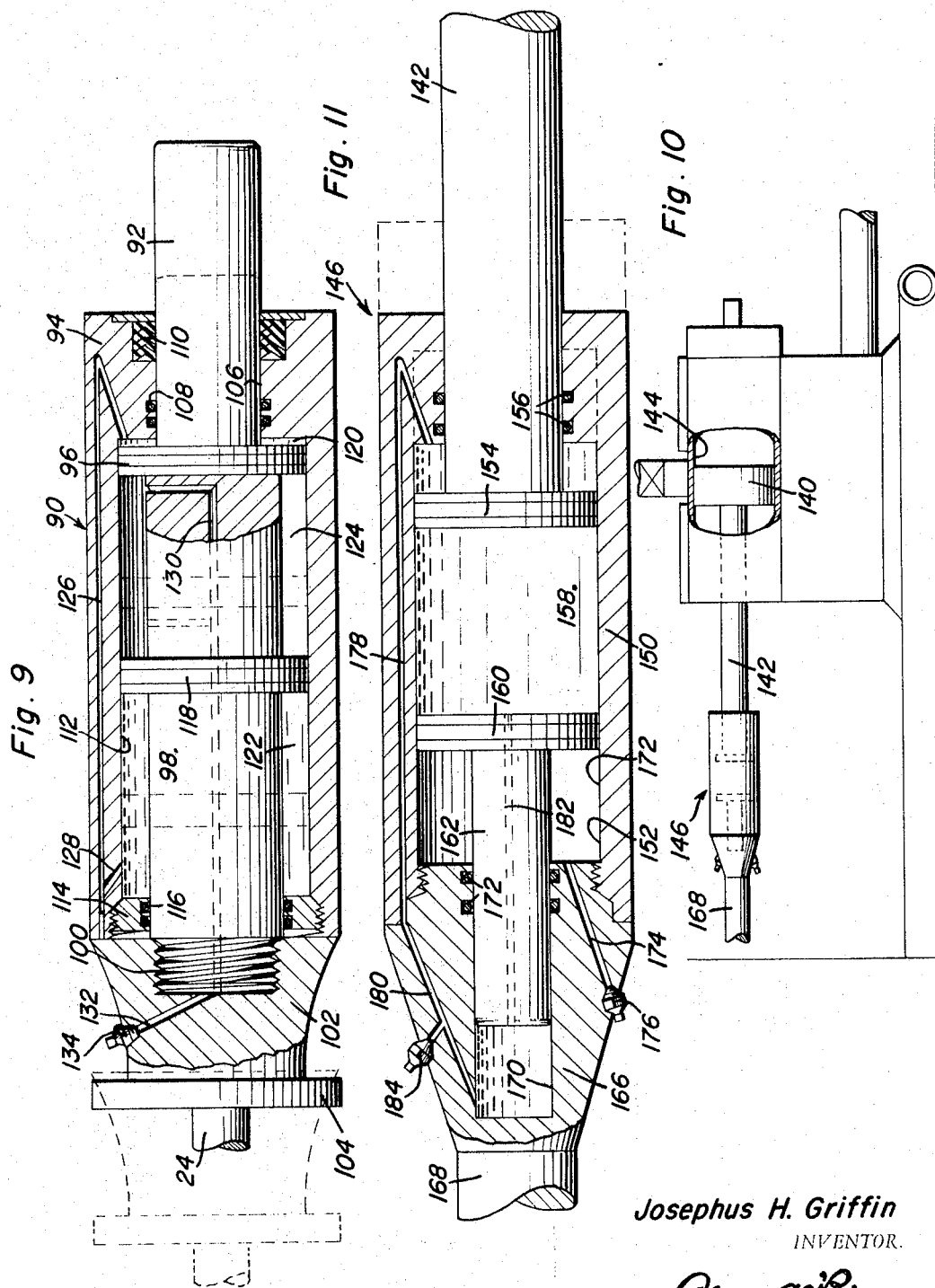

United States Patent Office 3,298,317
Patented Jan. 17, 1967

3,298,317
HIGH PRESSURE VARIABLE VOLUME PUMP
Josephus H. Griffin, Crowley, La., assignor of one-tenth to Eric B. Pousson, Acadia Parish, La.
Filed Apr. 7, 1964, Ser. No. 357,995
11 Claims. (Cl. 103—37)

This invention comprises a novel and useful high pressure variable volume pump and more particularly pertains to a reciprocating piston pump construction having a pressure-volume compensating plunger and sleeve incorporated therein and operable to vary the displacement of fluid by the pump piston as required to obtain a predetermined high pressure delivery by the pump while avoiding the creation of undue strains and loads upon the pump.

The primary object of this invention is to provide a means whereby a conventional-type of reciprocating pump may be operated at relatively higher pressures without increasing the load and strains upon the parts of the pump.

A further object of the invention is to provide a construction which will controllably reduce the displacement of the pump piston and thereby allow the pump to attain higher pressures without increasing the load and strain upon the pump components.

A still further object of the invention is to provide a means which will enable the obtaining of a controlled reduction in the pump displacement by causing the pump piston or a portion thereof to have a controlled recession or yielding motion during the piston pressure stroke.

Still another purpose of the invention is to provide a means effecting a controlled recession of the piston or a portion thereof by displacing oil between a pair of chambers incorporated into the piston structure or associated therewith and compressing air during the recession of the piston components to return the recessed members to their original position at the end of the pressure stroke of the piston.

Still another purpose of the invention is to provide a novel pump piston construction which may be selectively operable either with an effective full stroke or with a controlled recessive stroke.

A still further object of the invention is to provide a variable volume pump construction wherein a shiftable pressure-volume compensating element is employed which may be positioned either internally or externally of the stroke varying element of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary view in vertical central section through a portion of a conventional reciprocating piston-type of pump in which the novel variable volume construction of this invention is being incorporated;

Figure 5:
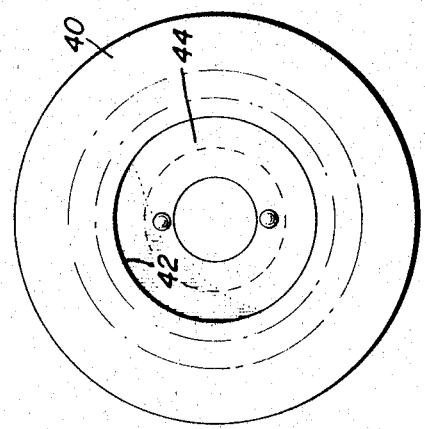
Figure 4:
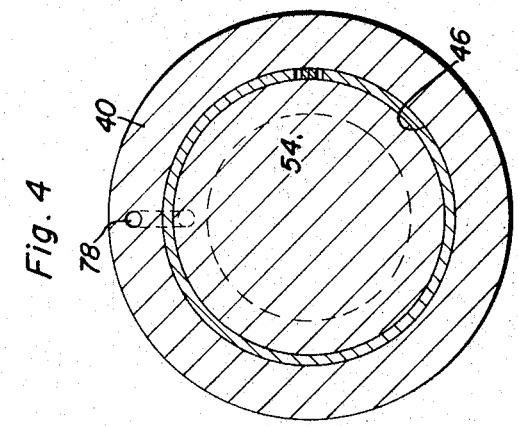
Figure 3:
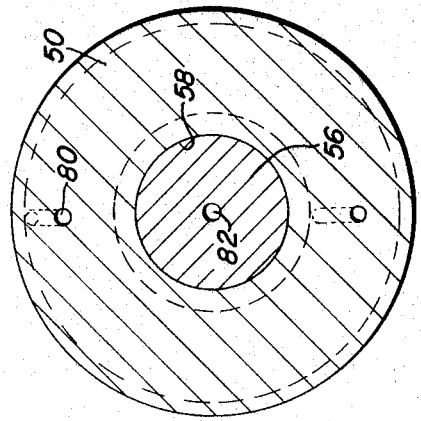
Figure 2:
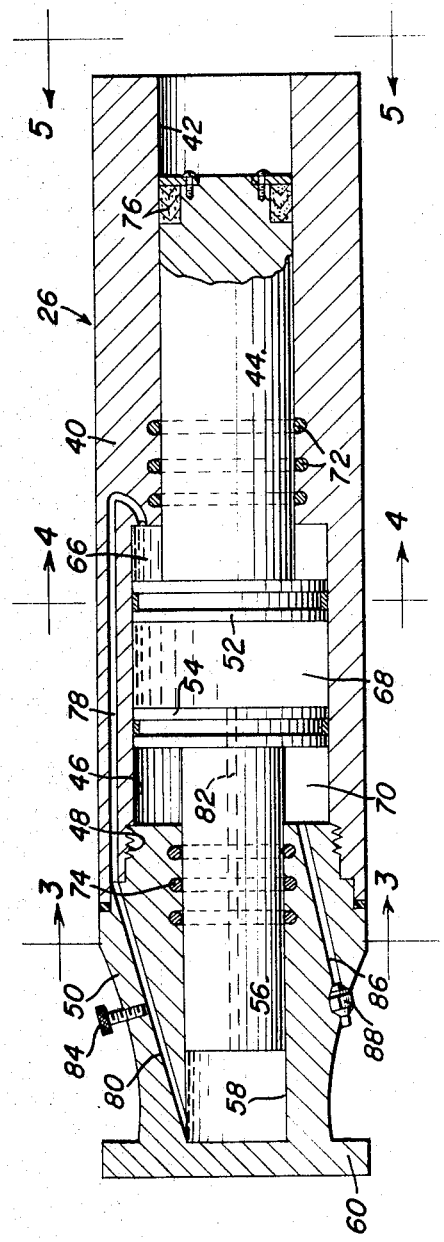
FIGURE 2 is a view taken upon an enlarged scale in vertical central longitudinal section through the piston element of FIGURE 1 incorporating therein the displacement varying means of this invention.
Figure 7:
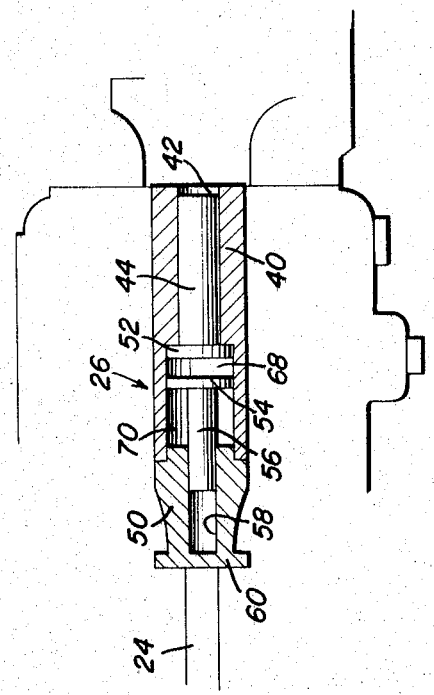
Figure 6:
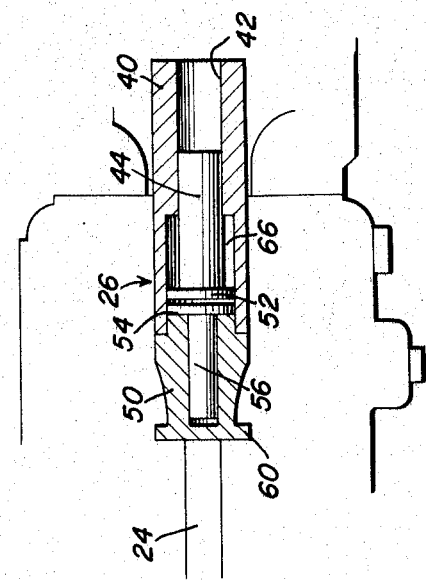
Figure 8:
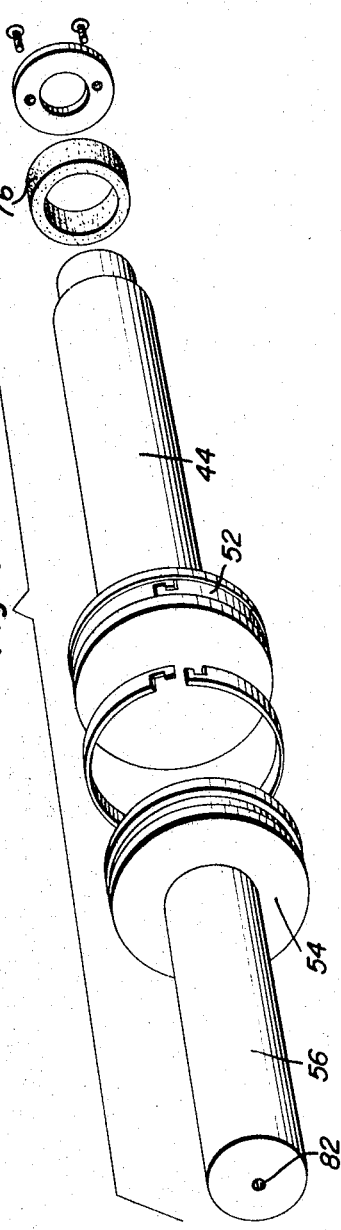

FIGURES 3-5 are vertical transverse sectional views taken upon an enlarged scale through the novel piston structure of FIGURES 1 and 2, being taken substantially upon a plane indicated by the section lines 3—3, 4—4 and 5—5, respectively, of FIGURE 2;

FIGURE 6 is a diagrammatic view showing the operation of the novel piston of this form of the invention during the working or compression stroke of the piston;

FIGURE 7 is a diagrammatic view similar to FIGURE 6 but showing the position of the parts during the return stroke of the piston and in preparation for the beginning of the compression stroke;

FIGURE 8 is an exploded perspective view of the internal components of the piston of this form of the invention;

FIGURE 9 is a view in vertical central longitudinal section of a second embodiment in accordance with this invention and wherein the recessive element of the assembly is disposed upon the exterior of the piston plunger;

FIGURE 10 is a view partly in elevation with parts broken away and shown in vertical section of a further embodiment of the invention wherein the variable volume compensating element is interposed in the piston rod and is used with a conventional piston; and FIGURE 11 is a view in vertical central longitudinal section taken upon an enlarged scale of the compensating element of FIGURE 10.

Reference is made first to FIGURE 1 showing a typical pump of the reciprocating type to which the piston of this invention may be applied. The pump illustrated is the well known Gardner-Denver model PA-8 Triplex Plunger Pump, although it will be appreciated that the principles of the invention are in no wise limited to this particular construction of pump. The pump includes a crankcase 10 having therein a jack shaft 12 driven from any suitable source of power, not shown, connected to a crankshaft 14 having thereon an eccentric crank throw 16 to which is attached a connecting rod 18. The latter operates in a crosshead 20 having a crosshead slide 22 to which is rigidly secured the rear end of a piston rod 24 to which the reciprocating piston 26 is connected by a conventional type of couping as at 28. The piston rod extends through a stuffing box or packing bushing 30 and is rigidly connected to the piston 26 which in turn slides through a combined bearing and packing member 32 and operates within the pump chamber 34. The latter is provided with the usual fluid inlet and fluid outlet valves, one of which is shown at 36 so that by reciprocation of the plunger in the chamber the volume of the latter will be alternately expanded and contracted, successively drawing in a charge of fluid and then compressing and discharging the fluid into the delivery line of the pump. Inasmuch as the foregoing pump structure is of conventional design, it is well understood by those skilled in the art and in itself forms no part of the invention set forth in the claims hereinafter, a further description is deemed to be unnecessary. It is in this environment of the reciprocating pump with which the present invention is concerned.

In prior pumps, the piston rod 24 and the pump piston 26 are rigidly connected together and the latter has a constant reciprocatory movement within the pump chamber 34 and thus a constant displacement of fluid therein. In other words, the capacity of the pump is fixed and depends upon the reciprocating stroke of the pump into and out of the pump chamber.

When reciprocating pumps of this conventional type are employed for high pressure operation, there is a considerable strain and load upon the parts of the mechanism which operate the reciprocating piston.

It is the primary purpose of this invention to provide a novel pump construction and operation which may be selectively activated or deactivated, so that when deactivated will function as a conventional pump plunger while when activated will reduce to a considerable extent the displacement of each stroke of the plunger by allowing the plunger or a portion thereof to recede relative to the remainder of the pump piston structure during the compression stroke thereof thereby allowing the pump to attain higher pressures without increasing the load upon the pump parts.

In the present invention, this controllable reduction of displacement of the pump piston is accomplished by hydraulic means incorporated into the pump or piston rod construction and which provides a hydraulic pressure chamber interposed between the driving thrust of the piston rod and the pump piston together with a storage or reservoir chamber receiving oil displaced from the pressure chamber so that as the latter decreases in volume the associated components of the pump piston will recede thereby shortening the overall length of the piston and thus decreasing the extent of its penetration into the pump chamber. The invention further contemplates the producing of an air pressure in an air compressor chamber by the recessive movement of the piston component which air pressure in turn is utilized to return the parts to their original position after completion of the pressure stroke of the piston.

Referring now primarily to FIGURE 2 it will be seen that the volume varying piston at 26 of this invention comprises a cylindrical hollow body or shell 40 having an axial bore 42 therein in which is slidably received for relative reciprocatory movement a piston plunger 44. The bore 42 is diametrically enlarged at its inner end as at 46 while the body or shell at its rear extremity is internally threaded as at 48 for the reception of a closure member 50. The enlarged portion 46 in turn is divided into a number of compartments or chambers. Thus, the plunger 44 at its inner end is diametrically enlarged to provide a control piston 52 which has a reciprocating fluid-tight travel in the bore 46. There is further received in this bore a return piston 54 carried by a piston stem or plunger 56 which in turn is slidably received in the bore 58 within the closure member 50, this latter bore 58 opening into the bore 46. It will be observed that the closed rearward end of the cap 50 is provided with a flange 60 which projects laterally therefrom and which mates with a corresponding flange 62, see FIGURE 1, so that a conventional form of clamp 28 serves to retain the flange 62 of the piston rod 24 in tight engagement with the flange 60 of the pump piston 26.

With continuing reference to FIGURE 2 it will be observed that the pistons 52 and 54 divide the bore 46 into three compartments. These consist of a hydraulic storage compartment 66, a central hydraulic pressure compartment 68 and an air compressor chamber or compartment 70. The relationship of these compartments 66 and 68 will be readily apparent for FIGURE 2.

Suitable packing and sealing means are provided to insure a fluid-tight fit of the various plungers and pistons in their respective bores. Thus, the bore 42 may be provided with a plurality of O-rings 72 forming a fluid-tight seal with the plunger 44, while corresponding O-rings 74 are formed in the bore 58 for the same purpose. Suitable packing means as at 76 are provided upon the pressure face of the pump piston plunger 44.

As so far described, it will now be observed that the pump piston includes two relatively movable components, these being the body or shell 40 and the pump piston plunger 44 slidably received therein. A hydraulic system is provided to control the relative position of and the movement of the plunger 44 in the bore 42 of the piston body 40. This hydraulic system is a closed circulating system in which a relatively incompressible hydraulic fluid such as oil is displaced between the pressure chamber 68 and the storage chamber 66 on opposite sides of the control piston 52. A passage means establishes communication between these chambers so as to permit the displacement of oil from one chamber to the other during the operation of the device when the hydraulic means is rendered operative.

The hydraulic system includes a series of passages including a passage 78 formed in the body of the shell or component 40, opening into the storage chamber 66. At its other end, the passage 78 communicates with a further passage or bore 80 disposed in the closure member 50 and opening into the extremity of the bore 58 at the end of the plunger 56 opposite piston 54. Finally, a passage 82 extends entirely through the return piston 54 and its plunger or stem 56 and thus establishes communication between the pressure chamber or compartment 68 and the other end of the bore 58 behind the plunger 56. A flow-restricting means consisting of any conventional form of adjustable control valve 84 such as a needle valve controls and regulates flow through the passages 78, 80 and 82 between the pressure and storage chambers 66 and 68, varying this flow from zero to a maximum. FIGURE 8 discloses more clearly the actual structure of the control and return piston components.

There is also provided an air passage means in the form of a bore 86 extending through the closure member 50 to establish communication between the air compressor chamber 70 and the atmosphere by means of a control valve 88.

The operation of this form of the invention, referring now to FIGURE 2 in conjunction with FIGURES 6 and 7, is as follows:

The piston components will normally be in the position or substantially the position shown in FIGURE 7 at the completion of the pump piston suction stroke or outstroke from the pump chamber 34. At this time, the inner component consisting of the plunger 44 will be at its forward position in the outer component or body 40 of the piston with the storage chamber 66 reduced to a minimum as by abutment of the control piston 52 against the inner extremity of its bore. The air compressor chamber 70 will be at its maximum since the pressure therein will push the return piston 54 inwardly of the bore 46, this inward movement effected by the compressed air in the chamber 70 acting upon the compression chamber to drive the plunger 44 in the forward position as illustrated in FIGURE 7.

As the piston rod 24 now starts the piston inwardly upon its pressure stroke, the pressure in the pump chamber will build up until the fluid outlet valve in the pump chamber opens to discharge the compressed fluid on the working stroke of the pump. During this travel, with the flow restricting valve 84 opened at least partially, the pressure increase will gradually force the plunger 44 rearwardly or recessively of the piston body 40 as shown in FIGURE 6. To the extent that the plunger 44 moves inwardly of its bore 42 in the piston body 40, the fluid within the pump chamber will be forced into the bore 42 thereby reducing the displacement of the fluid by the piston. During this rearward movement of the plunger 44 relative to the piston body 40, it is evident that the control piston 52 will exert a pressure upon the pressure chamber 68. This will displace fluid from the latter, driving this fluid through the passage system consisting of the bores and passages 82, 80 and 78 and into the storage chamber 66 which is being expanded. The valve 84 provides as does the restriction of the passages themselves, a resistance to the flow of hydraulic fluid. Consequently, there is a controlled resistance to recession of the plunger 44 within the bore 42 of the piston body during the pressure or delivery stroke of the piston. At the same time, as the return piston 54 moves outwardly or toward the left of this bore as viewed in FIGURES 2, 6 and 7, it will compress air in the air chamber of the compressor 70 to the rear thereof. When the piston has completed its stroke, and is engaged in its suction stroke, this compressed air from the air compressor 70 will drive the return piston 54 forwardly causing it to exert pressure upon the pressure chamber 68 which will in turn drive the control piston 52 and the plunger 44 back toward their original position and effecting a reverse displacement of the hydraulic fluid between the storage chamber and the pressure chamber.

It will be appreciated that by properly regulating the valve 84, any desired proportion of recession of the plunger 44 within the body 40 of the piston may be effected. When the valve 84 is closed, no movement is possible and therefore the piston 26 will operate as any conventional piston and will effect a full displacement of the fluid in the pump chamber. On the other hand, when the valve 84 is opened to provide the minimum resistance to flow, the plunger will recess or move rearwardly within the body 40 of the piston to its maximum extent thereby reducing the displacement of the pump chamber to a minimum. Obviously, by the use of the valve 84 the reduction in the pump displacement in the pump chamber can be regulated from zero to a maximum.

By this invention, the maximum working pressure of the pump can be attained but by reducing the volume delivered by the pump, the load strain upon the parts of the pump will be reduced.

Reference is made next to the construction of FIGURE 9 which shows a modified arrangement operating upon the same principle as that of the preceding embodiment. In FIGURE 9 the compensating pump piston is indicated generally by the numeral 90 and likewise has two relatively movable components, these consisting of concentrically and telescopingly arranged plunger 92 and piston body 94. However, in this form of the invention the body 94 is in the form of the cylindrical shell which is reciprocated upon the plunger 92 while the latter is directly secured to the piston rod 24. The plunger 92 is shown as having fixedly mounted thereon a control piston 96 corresponding to the control piston 52 in the preceding embodiment. Extending from the control piston 96 is a diametrically enlarged portion 98 of the plunger 92 and this portion is externally threaded as at 100 and engaged upon a plug or cap 102 having the mounting flange 104 by which it is secured to the piston rod in the same manner set forth in connection with the preceding embodiment. Slidably received upon the plunger 92 is the hollow body or shell 94. The latter includes a bore 106 having O-rings as at 108 and a packing or stuffing box 110 by which the plunger 92 is provided with a fluid-tight seal therethrough. The bore 106 is diametrically enlarged as at 112 to provide a cylindrical chamber which opens at the rearward end of the body, this chamber being closed as by a threaded plug or cap 114 likewise provided with O-rings 116 for fluid-tight seal with the plunger enlarged portion 98. Freely slidable upon the enlarged portion 98 is a floating return piston 118. It will thus be observed that the bore 112 has two relatively movable pistons 96 and 118 therein these being the control piston and the return piston respectively. These pistons divide the bore 112 into three compartments consisting of the storage compartment 122, the pressure compartment 120 and an air compressor chamber or compartment 124 each having the same function as in the preceding embodiment. A passage means is provided establishing communication between the pressure chamber or compartment 120 and the storage chamber or compartment 122. This passage means includes a passage 126 disposed in the shell or body 94 and which has one end communicating with the storage chamber 120 and its other end communicating by the conduit or passage 128 with the interior of the pressure chamber 122. The air chamber 124 communicates by the passage 130 extending through the plunger 92 wtih the passage 132 having a valved communication as at 134 to the atmosphere or other suitable source of air.

The operation of this form of the invention is identical to that previously described except for the relative relationship of the chambers and pistons.

Thus, with the parts in dotted line position as shown in FIGURE 9, as the piston 96 moves inwardly on its pumping stroke, the plunger 92 will be rigidly carried by the piston rod 24 and has a non-varying range of movement. However, pressure on the pump chamber applied to the face of the piston body 94, will cause the latter to recede or move rearwardly with respect to the plunger 92. This rear movement will compress air in the chamber 124, because the piston 118 is displaced by transfer of fluid from the pressure chamber 120 through the passage system 128, 126 into the storage chamber 122 as the piston 90 moves inwardly upon its compression stroke, the plunger 92 being rigidly attached to the piston rod 24 having an unvarying range of reciprocation. Upon completion of the pumping stroke, the air pressure with the oil chamber 124 will reverse the operation, drive the return piston 118 rearwardly and the piston body 94 forwardly and return fluid from the storage chamber 122 into the pressure chamber 122.

In the two preceding forms of the invention, the compensating assembly was embodied in the piston itself which consisted of two relatively movable concentric components. However, a still further form is possible as shown in FIGURES 10 and 11. In this construction, the numeral 140 designates a conventional double acting pump piston carried by the piston rod 142 and reciprocatingly disposed within the double-ended pump cylinder 144. In order to provide a compensating effect, there is provided as indicated generally by the numeral 146 an hydraulic compensating device based upon the same principles as those of the preceding embodiments.

Referring to FIGURE 11 it will be seen that this device consists of the cylindrical body or shell 150 having a bore 152 therein into which extends the piston rod 142. At its extremity this piston rod has a control piston 154 thereon, with the latter 142 being sealed in a fluid-tight manner as by O-rings or the like at 156. The control piston 154 defines within the bore 152 an hydraulic storage chamber or compartment 156 and a pressure chamber compartment 158 on opposite sides thereof. Also slidable in the bore 152 is a return piston 160 carried by a plunger or stem 162 slidably received within a bore in a closure member 166. The closure member in turn is secured to or forms part of a rod or stem 168 which is connected to the crosshead of the pump.

It will be noted that the closure member 166 is provided with a bore 170 therein into which the stem 160 is slidably received and which bore is provided with O-rings as at 172 for sealing purposes. As in the first form of the invention, the two pistons in the bore 152 define the three chambers 156, 158 and 172 which constitute a hydraulic storage chamber, a hydraulic pressure chamber and air compressor chamber, respectively.

The compressor chamber communicates with the atmosphere through a bore 174 having a control valve 176 therein. Fluid is displaced between the two hydraulic chambers by passage means consisting of the passage 178 disposed in the body 150, a further passage 180 extending through the closure member 166 and a passage 182 extending axially through the return piston and its stem or plunger 162. A control valve 184 restricts and controls flow through the passage assembly as in the preceding form of the invention.

The construction of FIGURES 10 and 11 thus enables the principles of the invention to be applied to a conventional pump by merely replacing the piston rod with a new piston rod having interposed therein the compensating sleeve assembly as disclosed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable variable capacity pump comprising a cylinder having a pump chamber therein, and a pump piston reciprocable in said chamber, fluid inlet and fluid outlet means communicating with said pump chamber, means for reciprocating said pump piston in said pump chamber, displacement varying means associated with said pump piston and varying the displacement of fluid from said pump chamber by said pump piston during the inward stroke of said pump piston into said pump chamber, said displacement varying means including a cylindrical outer body and a plunger relatively reciprocable therein, hydraulic means operatively engaging said plunger and body and yieldingly opposing relative movement of said body and plunger in a direction outwardly of said pump chamber, said hydraulic means including a chamber in said body, said plunger having a control piston reciprocating within said body chamber and dividing the latter into a pressure compartment and a storage compartment upon the inner and outer sides, respectively, of said control piston, said body including a passage communicating said pressure compartment into said storage compartment, a flow restricting means in said passage controlling flow therethrough.

2. The combination of claim 1 including an air compressor chamber, a return piston reciprocable in said body chamber and subjected on its inner side to the fluid in said pressure chamber and on its outer side to said air compressor chamber and constituting an air compressor piston, said air compressor piston yieldingly returning said pump piston to its full displacement position.

3. The combination of claim 2 wherein said hydraulic passage extends through said return piston.

4. An adjustable variable capacity pump comprising a cylinder having a pump chamber therein, and a pump piston reciprocable in said chamber, fluid inlet and fluid outlet means communicating with said pump chamber, means for reciprocating said pump piston in said pump chamber, displacement varying means associated with said pump piston and varying the displacement of fluid from said pump chamber by said pump piston during the inward stroke of said pump piston into said pump chamber, said pump piston comprising a pair of relatively axially movable components each having a piston face exposed to and working in said pump, said variable displacement means including a pressure compartment and a storage compartment in said pump piston, one of said pump piston components having a control piston slidable in said pressure compartment, a passage in said pump piston establishing communication between said pressure and storage compartments.

5. The combination of claim 4 wherein said pump piston components includes an outer cylindrical body and an inner plunger relatively slidable in said body.

6. The combination of claim 5 including a control means associated with said passage and operable to selectively render said displacement compensating means operable and inoperable.

7. An adjustable variable capacity pump comprising a cylinder having a pump chamber therein, and a pump piston reciprocable in said chamber, fluid inlet and fluid outlet means communicating with said pump chamber, means for reciprocating said pump piston in said pump chamber, displacement varying means associated with said pump piston and varying the displacement of fluid from said pump chamber by said pump piston during the inward stroke of said pump piston into said pump chamber, said displacement varying means including a cylindrical outer body and a plunger relatively reciprocable therein, hydraulic means operatively engaging said plunger and body and yieldingly opposing relative movement of said body and plunger in a direction outwardly of said pump chamber, said hydraulic means including a chamber in said body, said plunger having a control piston reciprocating within said body chamber and dividing the latter into a pressure compartment and a storage compartment upon the inner and outer sides respectively of said control piston, said body including a passage communicating said pressure compartment with said storage compartment, a flow restricting means in said passage controlling flow therethrough and an air compressor chamber, an air compressor chamber, a return piston reciprocable in said body chamber and subjected on its inner side to the fluid in said pressure chamber and on its outer side to said air compressor chamber and constituting an air compressor piston, said air compressor piston yieldingly returning said pump piston to its full displacement position, means controllably restricting flow into and out of said air compressor chamber.

8. In combination with an expansible chamber device having a piston displaced through a predetermined stroke, means for varying the volume displaced by the piston comprising, a pressure responsive control member movably mounted by said piston, fluid tight chamber means mounted by said piston having pressure and storage compartment separated by said control member, flow controlling passage means establishing fluid communication between the pressure and storage compartments for controlling volumetric changes in said compartments relative to each other, and compressible fluid means including a pressure chamber within said pressure compartment for regulating displacement of the control member relative to the piston.

9. The combination of claim 8 wherein said compressible fluid means comprises a piston element mounted within the pressure compartment spaced from said control member, and a source of compressible fluid connected to the pressure compartment on one side of the piston element, the pressure compartment on the other side of the piston element and the storage compartment being filled with a relatively incompressible fluid.

10. The combination of claim 9 wherein said control member includes a pressure face exposed to fluid under pressure within the expansible chamber device.

11. The combination of claim 8 wherein said control member includes a pressure face exposed to fluid under pressure within the expansible chamber device.

References Cited by the Examiner
UNITED STATES PATENTS

| | | | |
|---|---|---|---|
| 536,356 | 3/1895 | Montalto | 103—38 |
| 662,515 | 11/1900 | Yale | 103—38 |
| 671,007 | 4/1901 | Yale | 103—38 |
| 3,005,412 | 10/1961 | Camp | 103—38 |

FOREIGN PATENTS

| | | |
|---|---|---|
| 122,408 | 11/1944 | Australia. |
| 798,996 | 3/1936 | France. |
| 1,234,813 | 5/1960 | France. |

LAURENCE V. EFNER, *Primary Examiner.*